United States Patent [19]

O'Cheskey et al.

[11] 4,446,352

[45] May 1, 1984

[54] FILTER LEAF

[75] Inventors: Theodore H. O'Cheskey; Hugh T. Edwards, Jr., both of Whittier, Calif.

[73] Assignee: United States Filter Fluid Systems Corp., Whittier, Calif.

[21] Appl. No.: 443,670

[22] Filed: Nov. 22, 1982

Related U.S. Application Data

[63] Continuation of Ser. No. 177,265, Aug. 11, 1980, abandoned.

[51] Int. Cl.³ .............................................. B23K 27/00
[52] U.S. Cl. .............................. 219/121 LC; 210/488; 219/121 EC
[58] Field of Search ................. 219/121 LC, 121 LD, 219/121 EC, 121 ED; 210/488; 29/163.5 CW, 163.5 F

[56] References Cited

U.S. PATENT DOCUMENTS

| | | | |
|---|---|---|---|
| 3,679,062 | 7/1972 | Burkhart | 210/490 |
| 3,949,186 | 4/1976 | Nakayama et al. | 219/121 EM |
| 4,000,392 | 12/1976 | Banas et al. | 219/121 LM |
| 4,152,573 | 5/1979 | Saurin et al. | 219/121 L |

FOREIGN PATENT DOCUMENTS 603207  8/1978  Switzerland .

*Primary Examiner*—C. L. Albritton
*Attorney, Agent, or Firm*—Christie, Parker & Hale

[57] ABSTRACT

A filter leaf includes a continuous, elongated closure member, a first screen welded around its entire periphery to one side of the member, and a second screen welded around its entire periphery to the other side of the member to define a filtrate collection space between the two screens and the member. Means are provided for removing filtrate from the collection space. The filter leaf is made by clamping the closure member and one of the screens between two plates so the screen covers one side of the member and so the outer portions of the member and screen project outwardly from one of the plates. The outwardly projecting portions of the screen and member are irradiated with a laser beam to melt the screen and member to cause them to fuse together. The periphery of the outwardly projecting portions of the member and screen are moved relative to the laser beam while the member and screen are clamped together to form a continuous weld of the screen to the member around the entire periphery of the screen. The foregoing process is then repeated with a screen on the opposite side of the member so that an enclosed filtrate space is formed between the two screens and the interior wall of the member.

15 Claims, 12 Drawing Figures

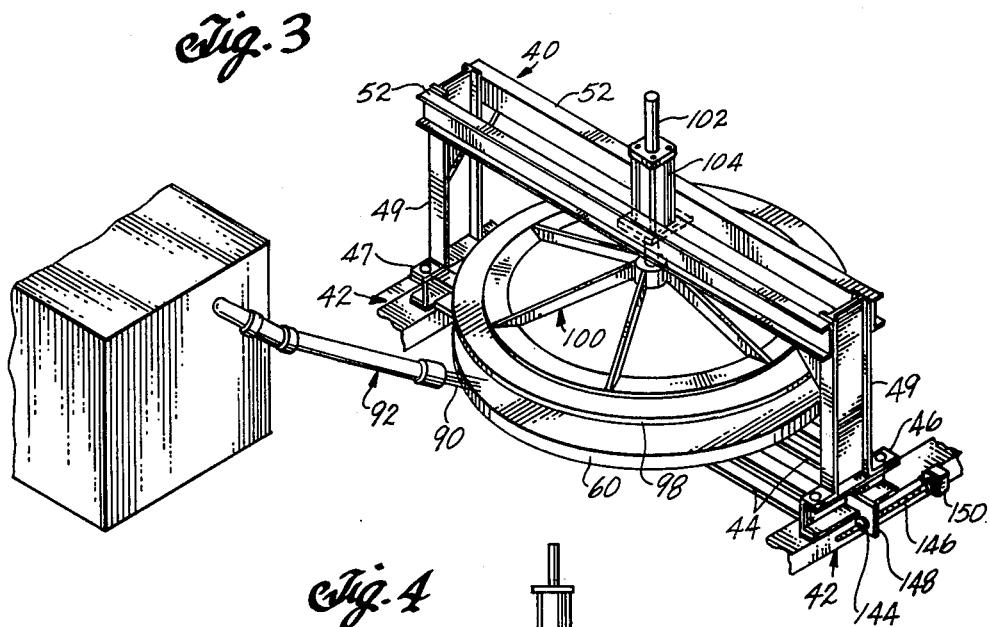
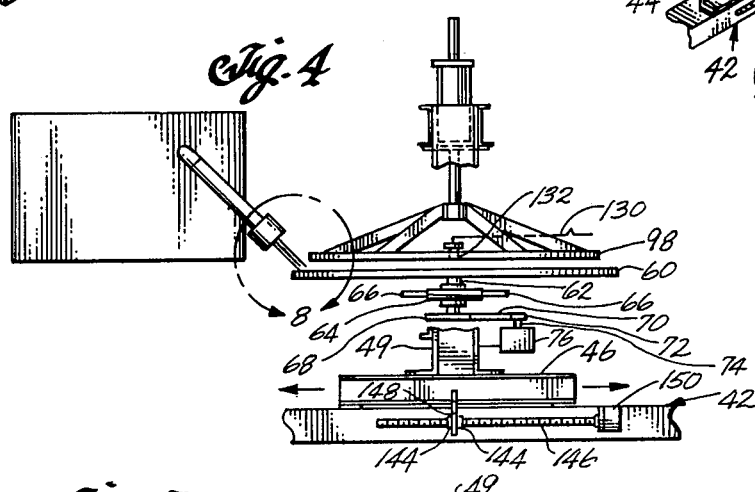
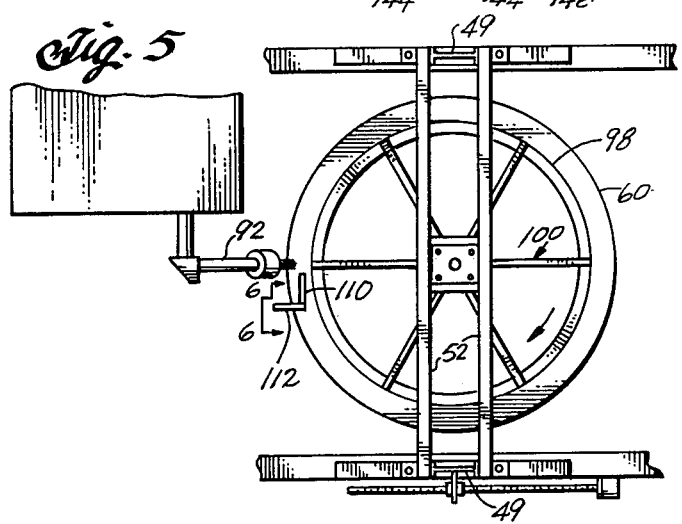

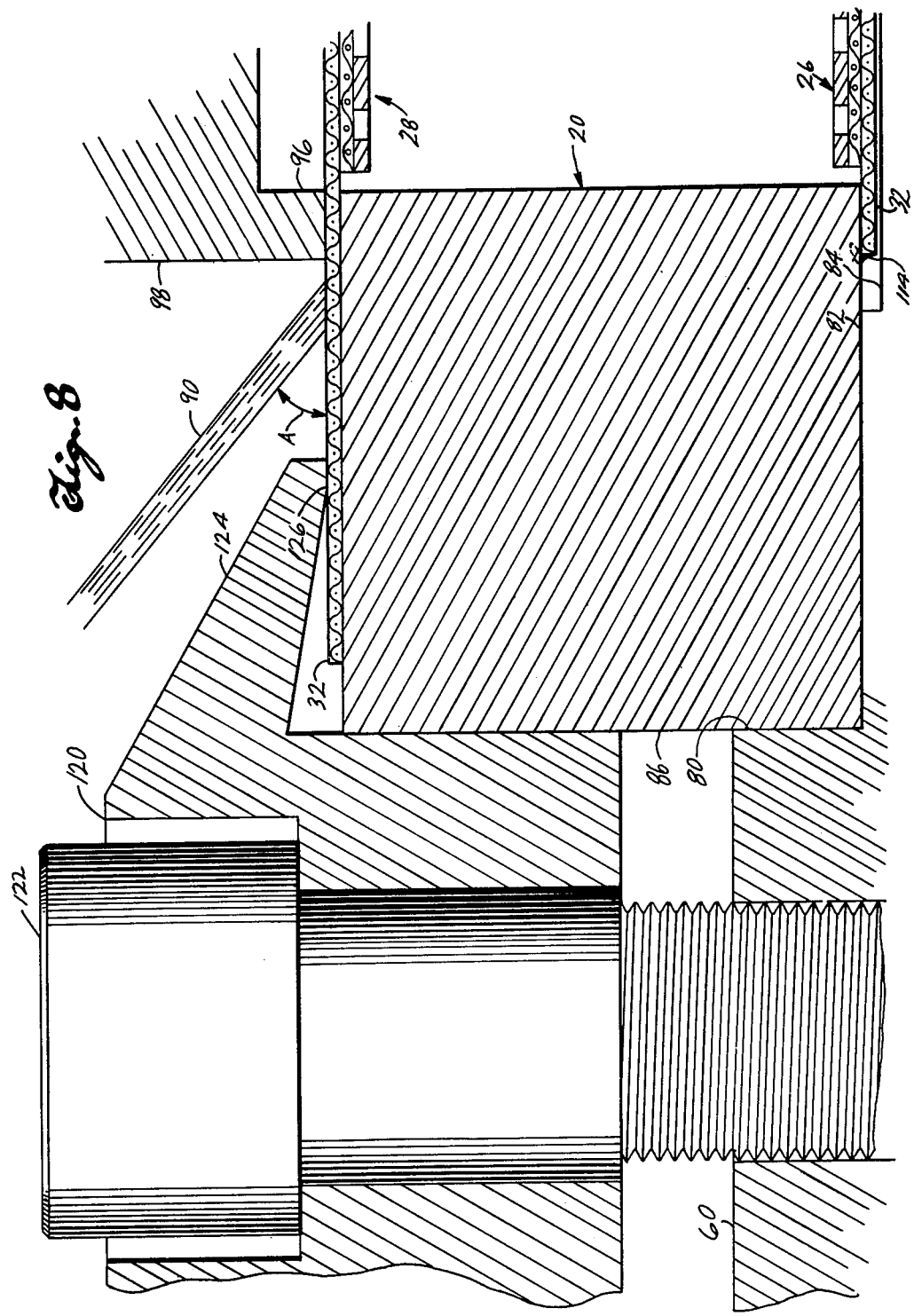

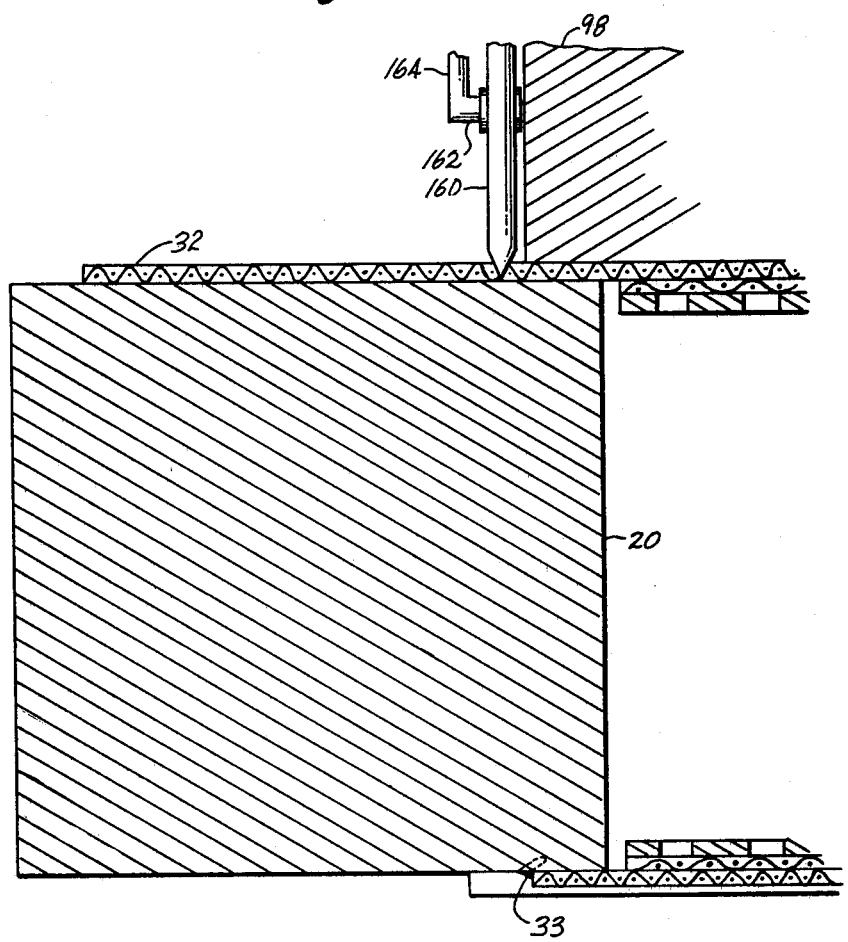

FILTER LEAF

CROSS REFERENCE TO RELATED APPLICATIONS

This is a continuation of application Ser. No. 177,265, filed Aug. 11, 1980, now abandoned.

FIELD OF THE INVENTION

This invention relates to filter leaves.

DESCRIPTION OF THE PRIOR ART

Filtration apparatus has long been used to filter a wide variety of materials, such as water, oil, juices, syrups, beer brew, and the like. Some of the most effective filters have a closed chamber in which the liquid to be filtered is delivered under pressure and forced through a plurality of parallel filter leaves feeding into a common outlet. The interior of each filter leaf communicates with the common outlet and delivers filtrate to it.

A typical filter leaf includes a pair of screens secured to one or both sides of a closure ring. Material to be filtered is forced through the screens and into the filter space within the rings and screens. The leaf may be of either the rotary or the stationary type. U.S. Pat. No. 3,542,205 shows a rotary filter leaf.

For many years, the industry has sought to make a satisfactory filter leaf with stainless steel screens welded at their peripheries to opposite faces of a stainless steel closure ring. Such attempts were not successful because the welding was slow, and it increased the temperature of the closure ring so much that it expanded an unacceptable amount during the welding operation. After the ring cooled, it shrank, causing the screens welded to it to be loose. Slack screen will take a precoat, but will pop out and crack the precoat.

Even with only a moderate amount of looseness, a screen will "heave" when subjected to different flow conditions. For example, when a filter screen is precoating with a thin coat of filter aid, that coat cracks when the liquid pressure applied to the precoat is released, and the screen pops back to its original position. This results in contaminated filtrate during the subsequent filtering step. With even more slack in the screen, it wrinkles, and, because of repeated cycling between high and low pressure during filtration, the wrinkled screen flexes back and forth, work hardens, and eventually fails.

This invention overcomes the disadvantages of the prior art by providing filter leaves made of closure members with screens welded to them in such a way that the screens remain tight on the members and do not heave or wrinkle and fail prematurely. Moreover, the welding is done more than ten times faster than with the prior art welding.

SUMMARY OF THE INVENTION

This invention provides a filter leaf which includes a continuous, elongated closure member having a major plane. First and second screens are secured to opposite sides of the entire periphery of the member by a welding process selected from the group consisting of electron beam welding and laser beam welding to define a filtrate collection space between the two screens and the ring. Means are provided for removing filtrate from the collection space.

The heat for the welding is confined to such a small area at all times, and is of such limited duration that the overall temperature change of the closure member is so limited during welding, that the member is not subject to objectionable expansion and contraction. Accordingly, the screens, which fit tightly over the member during welding, remain tight and wrinkle-free after welding. Moreover, the process of this invention avoids relieving internal stresses in the closure member, which is sometimes shaped by bending it. If the member is subsequently stress-relieved by overheating, it warps out of its desired shape.

In the preferred form, the member and screens are made of stainless steel, and the screens are simultaneously cut to the exact size and are welded to the member by laser welding.

In one form, a separate perforated steel plate underlies each screen, and a coarse screen is disposed between the perforated plate and the filtering screen. The preferred form also includes a rigid, permeable support between the two perforated steel plates. Preferably, the perforated steel plate, the coarse screen, and the outer filter screen in each group of those elements are secured together by diffusion bonding, and the permeable steel support between the two permeable plates is tack-welded at its periphery to the interior of the ring at spaced intervals. In the preferred form of the leaf, the welding is performed in such a manner that an annular and inwardly extending weld bead is formed in the closure member under the periphery of the screen where it is welded to the member.

BRIEF DESCRIPTION OF THE DRAWINGS

FIG. 3 is a perspective view of apparatus for making a circular filter leaf in accordance with this invention;

FIG. 4 is an elevation, partly broken away, of the apparatus shown in FIG. 3;

FIG. 5 is a plan view of the apparatus shown in FIG. 4;

FIG. 8 is an enlarged sectional view taken in the area of arrow 8 in FIG. 4;

FIG. 10 is an enlarged fragmentary sectional elevation showing apparatus for cutting the screen before welding it to the closure member;

DESCRIPTION OF THE PREFERRED EMBODIMENTS

Figure 1:
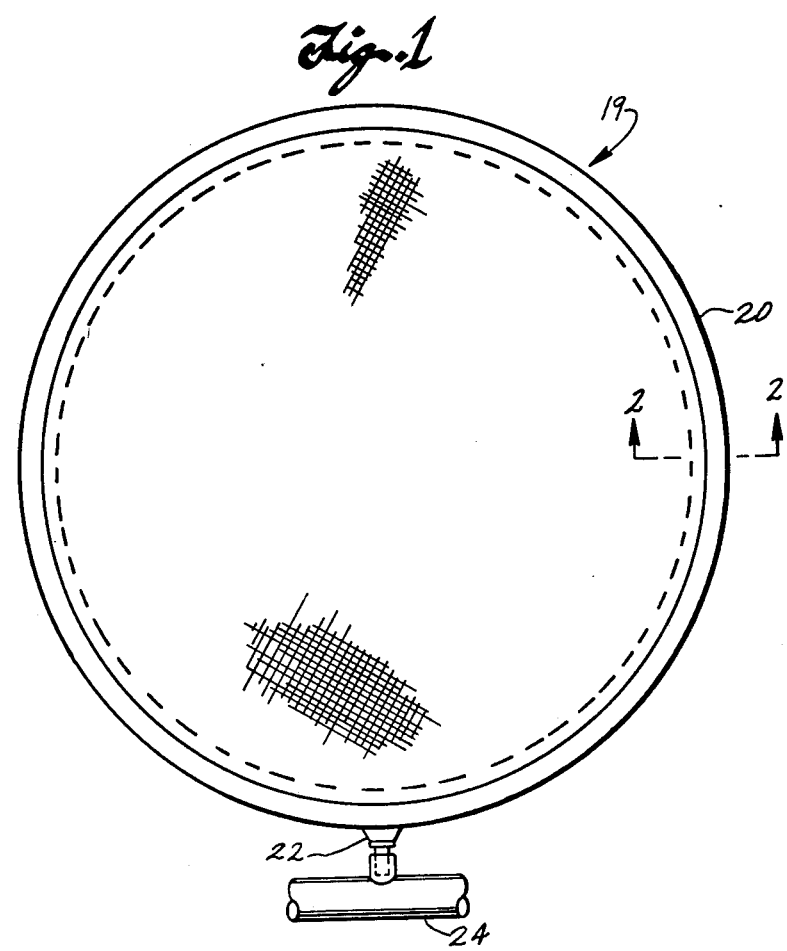
FIG. 1 is an elevation of a stationary filter leaf made in accordance with this invention.
Figure 2:
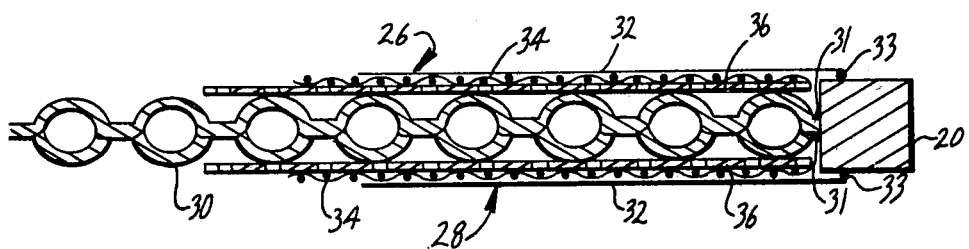
FIG. 2 is a view taken on line 2—2 of FIG. 1.

Referring to FIGS. 1 and 2, a circular filter leaf of the stationary type includes a circular closure ring 20 having an outlet 22 through the lower portion of the leaf periphery. The leaf outlet is connected to a conventional header pipe 24 for the removal of filtrate from the filter leaf interior. The major plane of the closure ring defines the major plane of the leaf. The diameter of the leaf may be be any suitable size, say, 48", and the closure ring may be square in cross section, or any other required shape. In a typical 48" circular, stationary filter leaf, the cross section of the closure ring is ⅛"×⅛".

As shown in FIG. 2, a first three-layer, diffusion-bonded laminate 26 is welded around its entire periphery to the upper (as viewed in FIG. 2) side of the closure ring 20. A second three-layer, diffusion-bonded laminate 28 is welded around its entire periphery to the lower (as viewed in FIG. 2) side of the closure ring.

A circular piece 30 of tubular slit screen or a coarse-mesh screen (say, 1-mesh screen) between the two laminates is secured around its periphery to the inner face of the closure ring by tack-welds 31 on each side of the tubular slit screen and at intervals of about 45°.

Each of the three-layer laminates includes an outer filter screen 32, which is of circular shape and has a relatively fine mesh, say, equivalent to 24×110 "Dutch" or HF75 stainless steel screen, welded by a continuous weld bead 33 around its entire periphery to one side of the closure ring. A circular course screen 34, say, 16-mesh stainless steel wire, underlies each fine screen, and a perforated disk 36 rests on each side of the tubular slit screen. The disk preferably is 20-gauge stainless steel perforated with 3/16" holes on ¼" staggered centers. As indicated above, the outer filter screen, the coarse screen, and the perforated disk in each three-layer laminate are diffusion-bonded together to form a relatively rigid structure. The coarse screens and perforated disks each have diameters slightly less than the interior diameter of the closure ring. The diameter of the fine screen is slightly larger than the inside diameter of the closure ring to overlap the inner edge of the ring to which the fine screen is attached by about ⅛" to provide material for the weld. The overlap is as small as practical to minimize the space between the unwelded portion of the fine screen and the closure ring. This area in previous filter leaves provided unwanted traps for solid particles filtered from liquids, and interfered with proper cleaning of the leaves. This problem is minimized with the present invention.

As explained in more detail below, the three-layer, diffusion-bonded laminates secured to the closure ring, as shown in FIG. 2, form a tight "skin" over opposite sides of the closure ring. Each "skin" is relatively rigid because of the diffusion-bonding of the three layers, and because each three-layer laminate rests on the tubular slit screen, which itself provides rigid support. There are no wrinkles or slack in the laminates so that the metal screens do not work harden as the filter leaf is cycled through various stages of filtration steps. Accordingly, the leaf has a long and reliable life under severe service conditions.

Apparatus for making the filter leaf shown in FIGS. 1 and 2 is shown in FIGS. 3–10.

The apparatus includes an upright frame 40 mounted on a support 42. The frame includes a lower pair of elongated, parallel, and horizontal channel-beams 44, each welded at opposite ends to a respective foot 46, 47. Each foot is a horizontal channel beam which rests on the support 42. A pair of vertical legs 49 are each secured at their respective lower ends to foot 46 and foot 47. An upper pair of elongated parallel and horizontal channel beams 52 are secured at their respective ends to the upper end of each leg 49.

A rotatable circular horizontal bottom plate 60 is mounted on the upper end of a vertical drive shaft 62 journaled in a thrust bearing 64 supported by brackets 66 from the lower channel-beams 44. The lower end of the drive shaft carries a pulley 68 driven by a belt 70 from a drive pulley connected by a shaft 74 to a variable speed motor 76. As shown in FIG. 8, the bottom plate 60 includes an annular upright wall 80 around its entire periphery. An annular, inwardly extending, horizontal step 82 at the bottom of wall 80 terminates in a circular, upwardly opening, shallow recess 84. During a welding operation, a bottom surface of the closure ring 20 rests on the step 82. An outer face 86 of the ring bears against the inner face of upright wall 80 so that the ring is centered with respect to the center of the bottom plate and the axis of rotation of drive shaft 62. As shown in FIG. 8, the first three-layer, diffusion-bonded laminate 26 has already been welded to the bottom side of the closure ring, and outer filter screen 32 fits into the circular recess 84 adjacent the inner edge of horizontal step 82. The second three-layer, diffusion-bonded laminate 28 is in the process of being welded to the top side of the closure ring by a welding beam 90 of intense energy supplied from a source 92, such as a gas or crystal laser, or an electron beam. Of course, if an electron beam is used, the entire apparatus should preferably be enclosed in a vacuum chamber (not shown).

As shown in FIG. 8, outer filter screen 32 extends almost entirely across the upper side of the closure ring 20 to insure that there is adequate material to be welded to the ring. However, the weld is made as close as practical to the interior face of the ring. For example, preferably the weld is only 0.1 to 0.2 inches from the inner face of the ring. To this end, the outer filter screen 32 is clamped against the upper (as viewed in FIG. 8) side of the closure ring by a downwardly extending annular wall 96 on the lower face of a circular hold-down plate 98 mounted concentrically above the bottom plate 60. The outside diameter of the hold-down plate is only about ⅛" greater than the inside diameter of the closure ring, so the overlap is about 1/16".

The hold-down plate is supported by a spider 100 secured to the upper surface of the hold-down plate and supported from a vertical piston rod 102 connected to a piston (not shown) in an air cylinder 104 secured between the upper beams 52. Compressed air is supplied to either end of the cylinder by conventional means (not shown) so that the piston, piston rod, spider, and hold-down plate can be moved up and down with respect to the bottom plate to clamp the closure ring and outer filter screen, as shown in FIG. 8. As stated above, the diameter of the hold-down plate is only slightly greater than the inside diameter of the closure ring. For example, if the closure ring has an inside diameter of 47", the outside diameter of the hold-down plate is 47⅛". As shown in FIG. 8, the thickness of the downwardly extending annular wall 96 on the lower face of the hold-down plate about equals the amount by which the hold-down plate overlaps the inner edge of the closure ring. If desired, the annular wall 96 may be eliminated so that the bottom face of the hold-down plate is smooth. This provides a firm contact of the bottom face of the hold-down plate with substantially the entire area of the outer filter screen when the hold-down plate is moved down into the clamping position shown in FIG. 8. This results in a smoothing action on the screen to eliminate any wrinkles which may be present before welding.

Figure 6:
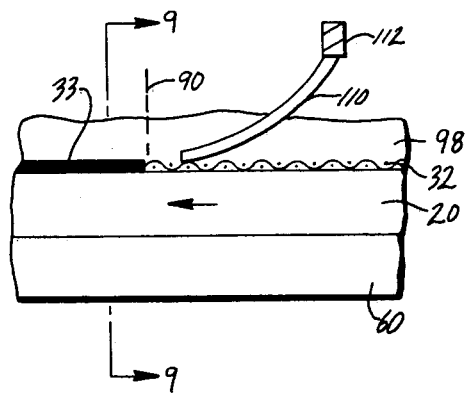
FIG. 6 is a view taken on line 6—6 of FIG. 5.
Figure 9:
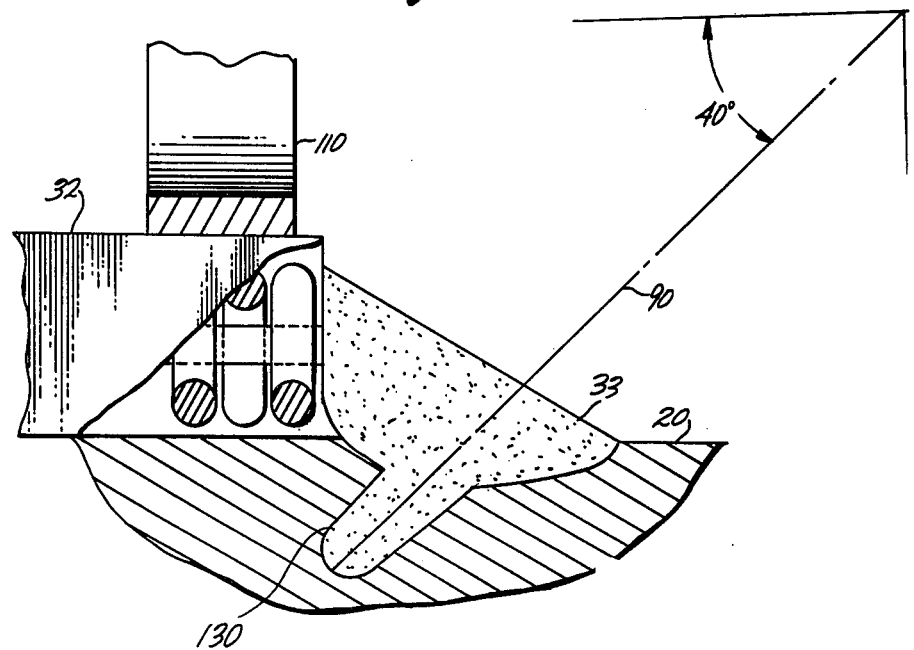
FIG. 9 is a view taken on line 9—9 of FIG. 6.
Figure 7:
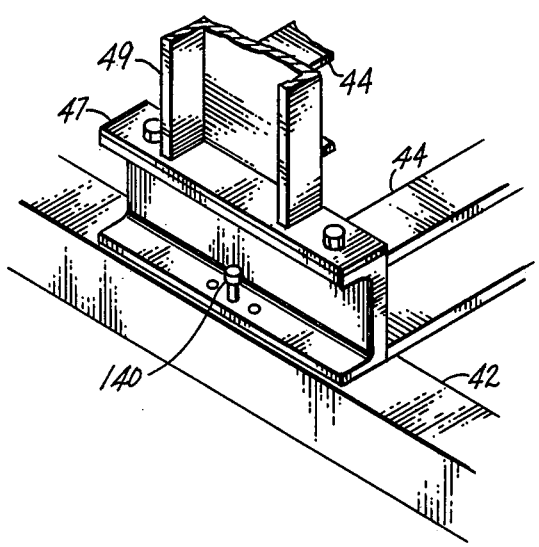
FIG. 7 is an enlarged fragmentary perspective of one end of a frame on which the apparatus shown in FIGS. 3-5 is mounted.

As shown in FIGS. 5, 6, and 9, a curved, flat spring blade 110 extends downwardly from a stationary bracket 112 mounted adjacent the upper surface of the periphery of the bottom plate. The blade extends downwardly in a direction generally tangential to the bottom plate, and is curved concavely upwardly. The lower end of the curved, flat blade bears against the upper surface of the outer filter screen, and holds the screen in firm contact with the upper surface of the closure ring adjacent the periphery of the hold-down plate 98 at a point just before the screen passes under the welding beam 90. As shown in FIG. 6, the lower plate 60, the closure ring 20, the outer filter screen 32, and the hold-down plate 98 move from right to left as indicated by the arrow so the welding bead 33 is formed where the welding beam 90 strikes the screen and the closure ring. At this point, the beam cuts through the screen by melting it. The beam also simultaneously penetrates and melts the portion of the ring immediately underlying the cut screen. The molten metal from the two pieces fuses, cools, and solidifies to form the weld bead which bonds the inner portion of the screen to the ring, and leaves the outer portion of the screen free to be removed.

As shown best in FIGS. 4, 8, and 9, the welding beam is inclined at an angle A with respect to the major plane of the filter leaf so that the angle between the beam and the major plane of the leaf is about 40°. We have found that this angle is fairly critical for cutting through the screen and simultaneously melting the ring to produce the weld bead which leaves the outer portion of the screen free. If the angle is increased above about 50°, the result is poor welding and incomplete cutting through the screen. If the angle is decreased to about 30°, it bounces off the work and does not melt the metal.

We have also found that when the outer filter screen is arranged as shown in FIG. 8, i.e., with a substantial portion projecting outwardly from the hold-down plate and over the upper side of the closure ring, it is advantageous to hold down the outer edge of the projecting screen to insure good contact between the screen and the closure ring where those two elements are impacted by the welding beam.

To this end, an annular clamping ring 120 (shown only in FIG. 8) is secured by bolts 122 to the upper face of the periphery of the bottom plate. The hold-down ring includes an annular, inwardly and downwardly extending flange 124, the outer end of which has a horizontal surface 126 on its underside to bear against the outer filter screen just outside the path traced by the welding beam as the apparatus is rotated.

Preferably, the bottom plate, hold-down plate, and clamping ring are all of a material having a much higher thermal conductivity than the material being welded, which is usually stainless steel. For example, stainless steel has a thermal conductivity coefficient of 113 BTUs per hour/per square foot/per degree F./per inch. The thermal conductivity coefficient for aluminum is 1390. Copper is 2700, and silver is 2900. By using a material such as aluminum, copper, silver, or alloys of those or similar metals, for the bottom plate, hold-down plate, clamping ring, and depressor blade, heat is quickly conducted away from the area of the weld to avoid overheating, overexpansion, and stress-relieving of the closure ring.

To protect the metal during welding, an inert gas, such as argon, helium, or the like, is injected through a flexible gas line 131 connected to a vertical bore 132 extending through the hold-down plate. The inert gas is pumped into the space between the hold-down plate, the annular ring, and the bottom plate. The gas escapes through the unwelded portion of the outer filter screen. Thus, the screen and closure ring are flushed with inert gas in a direction from the inside out to keep oxygen away from molten metal during the welding operation.

This minimizes spattering of the molten metal, which produces a better weld and avoids contamination of the lens (not shown) used to focus the welding beam when a laser source is used. Inert gas is also blown onto the area to be welded exterior of the hold-down plate.

As indicated previously, the high energy welding beam 90 can come from any suitable source. We have found that conventional carbon dioxide or YAG (yttrium-aluminum-garnet) lasers produce satisfactory welds because they confine heat to a very small area so that the closure ring is not over-heated during the welding operation. This, coupled with the heat removal provided by the surrounding aluminum parts, produces a surprising result of a screen welded around its entire periphery to a continuous closure member which does not shrink after welding to wrinkle the screen. This provides a filter leaf having a long life under severe service conditions.

During the welding operation shown in FIG. 8, the high energy welding beam 90 cuts through the screen by melting it, and penetrates the upper surface of the ring or member closure just outside the periphery of the hold-down plate. The result is the annular welding bead 33 shown in FIG. 9. Surprisingly, the weld bead bonds the periphery of only the inner portion of screen to the closure ring, and leaves the outer portion of the screen free. The bead has an inwardly and downwardly extending annular flange 130 so the inner portion of the screen is not only sealed to the closure ring around the entire periphery of the screen, but is also mechanically locked to it by the inwardly and downwardly extending flange 130 embedded in the closure ring.

An important advantage of this invention is that the simultaneous cutting and welding of the screen can be done at the relatively high speed of 20 to 80 inches per minute using conventional laser equipment. This is substantially faster than oxyacetylene gas or inert gas arc welding, which are limited to speeds between about two and about three inches per minute. Moreover, oxyacetylene gas and inert gas arc welding overheats the ring so that the screen wrinkles as the ring cools.

After the weld is completed, the clamping ring 120 is removed, and the cutaway margin of the outer filter screen is discarded. If any of the wires are incompletely cut, they are broken by bending them back and forth. Any unfused wires are thereafter "fire polished" to fuse with the weld bead by shifting the center of rotation of the lower and hold-down plates about 0.020" away from the point at which the welding beam strikes the work, i.e., to the right, as viewed in FIG. 8. The process is then repeated so that the welding beam then strikes the protruding wires to melt and fuse them with the weld bead.

To permit shifting of the center of rotation as just described, a vertical pivot pin 140 secures the foot 47 to the support 42 so that the frame 40 can pivot in a horizontal plane about the upright axis of the pivot pin. The other foot 46 can slide on the support 42, and is moved to the right or left (as viewed in FIG. 4) by adjusting nuts 144 threaded onto a horizontal screw 146 on opposite sides of a vertical plate 148 welded to the foot 46. One end of the screw 146 is secured to a bracket 150 welded to the support 42, and the other end passes through an opening (not shown) in plate 148. Thus, as the nuts 144 are turned, the frame is precisely positioned by pivoting it about pivot pin 140. Alternatively, foot 46 and foot 47 can each be mounted to slide in a separate way (not shown) on the support so that the center of rotation is shifted along a straight line instead of an arc.

FIG. 10 shows an alternate embodiment of the invention in which a cutting wheel 160 is mounted adjacent the periphery of the hold-down plate 98 to rotate about a horizontal shaft 162 on the lower end of an upwardly extending bracket 164 secured to the support by any suitable means (not shown). Conventional adjusting means (not shown) are provided for moving the bracket 164 and shaft 162 up and down with respect to the bottom plate 60 so that the cutting wheel engages the outer filter screen 32 resting on the closure ring 20. The bottom plate is rotated at a suitable speed so the cutting wheel cuts through the outer filter screen. The cutaway margin of the screen is removed, and the remaining screen is thereafter welded to the closure ring as described above. The advantage of the apparatus shown in FIG. 10 is that the high energy welding beam need not be used for a cutting operation, thus requiring less time and power, and permitting the beam to be concentrated on melting and fusing only that portion of the screen and closure ring which form the weld bead.

Figure 11:
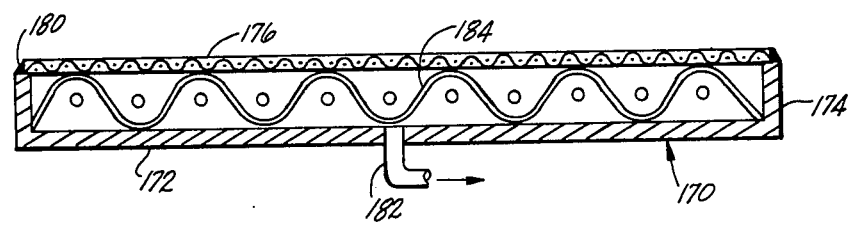
FIG. 11 is a sectional elevation of a pan-type filter leaf made in accordance with this invention.

Although the invention has been described in detail with respect to a stationary circular filter leaf, a rotary filter leaf can, of course, be made in accordance with this invention. In fact, the leaf may have any shape, such as square, rectangular, triangular, oval, and the like, and may only have one screen. For example, FIG. 11 shows a pan-type filter leaf, which includes a shallow pan 170 (closure member) having a flat, square, or rectangular bottom 172, and an upwardly extending wall 174 around the periphery of the pan bottom. An outer filter screen 176 is welded around its entire periphery to the upper edge of the wall 174 using an X-Y table to move the work or the laser source in accordance with the invention described above to form a continuous weld bead 178 around the entire periphery of the screen to bond the screen to the upper edge of wall 174. Thus, a filtrate space is formed between the screen and the closure member or pan 170. A drain 182 in the central portion of the pan removes the filtrate. If desired, a coarse screen 184 is disposed within the pan to support the outer filter screen 176.

Figure 12:
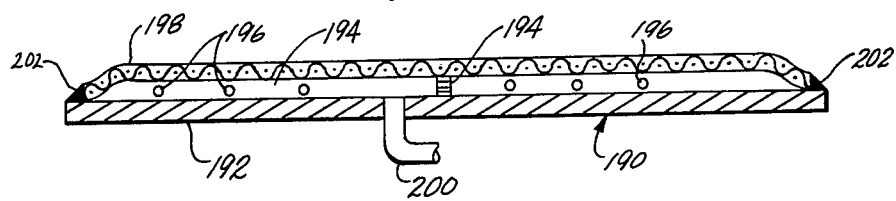
FIG. 12 is a sectional elevation of a plate-type filter leaf made in accordance with this invention.

FIG. 12 is a sectional elevation of a plate-type filter leaf 190, which includes a circular plate 192 (closure member) having a plurality of radially extending ribs 194 on its upper surface. The ribs meet in the center of the plate and have transverse drain holes 196 extending through them to permit filtrate (not shown), which passes through a filter screen 198 on the ribs, to flow to a common outlet 200. The filter screen 198 is secured around its entire periphery by a weld bead 202 to the periphery of the plate 192 so that a filtrate collection space is defined between the filter screen and the plate or closure member. The plate may include as many ribs as are necessary to support the screen, depending on the type of service in which the filter will be used.

From the foregoing description, it will be apparent that the present invention provides an improved filter screen made quickly and easily by welding the components together with a high energy welding beam in such a manner that the closure member encircling the filter leaf does not shrink after the welding operation, thereby avoiding the creation of wrinkles which would result in early failure under service conditions. Moreover, the weld bead is close to the inner edge of the closure member to virtually eliminate dead space which traps and holds unwanted matter during filtering and cleaning.

The invention has been described in which the workpieces to be welded are rotated while the welding beam is held stationary, but the reverse arrangement can be used, i.e., the beam can be moved while the work is held stationary. For example, the source of the welding beam may be mounted or an X-Y numerically controlled table so that a weld of any desired path may be traced. Alternatively, the bottom plate and hold-down plate may be mounted on an X-Y table for controlled movement in a manner well known to those skilled in the art.

Reference is made to a continuation application Ser. No. 469,730 filed on Feb. 25, 1983 which claims subject matter related to the disclosure herein.

We claim:

1. A filter leaf comprising:
  a closed frame having an inner periphery defining an open space within the frame and an outer periphery, a first flat side surface extending between the peripheries, and a second flat side surface extending between the peripheries;
  a first screen covering the open space such that the outer periphery of the first screen overlaps and abuts the first side surface of the frame;
  a first bead made of the same material as the first screen bonding the edge of the first screen to the first side surface of the frame, the first bead having a flange extending into the frame from the edge of the first screen toward the inner periphery of the frame;
  a second screen covering the open space such that the outer periphery of the second screen overlaps and abuts the second side surface of the frame; and
  a second bead made of the same material as the second screen bonding the edge of the second screen to the second side surface of the frame the second bead having a flange extending into the frame from the edge of the second screen toward the inner periphery of the frame.

2. A filter leaf comprising:
  a closure member having a planar surface including a band extending completely around the member;
  a screen covering the closure member such that the edge of the screen is adjacent to the band; and
  a continuous bead made of the same material as the screen bonding the edge of the screen to the band all around the edge of the screen.

3. The filter leaf of claim 2, in which the screen has a side surface facing toward the closure member, such that the edge surrounds the side surface, and the screen is planar, the bead bonding the edge of the screen to the band without bonding the side surface of the screen to the closure member.

4. The filter leaf of claim 2, in which the closure member comprises a closed frame having an inner periphery defining a space within the frame, an outer periphery, and a flat side surface extending between the peripheries, the screen covering the open space such that the outer periphery of the screen overlaps and abuts the side surface of the frame.

5. The filter leaf of claim 4, in which the frame is annular and the edge of the screen as well as the beads are circular.

6. The filter leaf of claim 2, in which the closure member comprises a flat circular plate and the band comprises an annular surface on the plate, the filter leaf additionally comprising a plurality of ribs disposed between the closure member and the screen to space the screen from the closure member in the region bounded by the edge of the screen.

7. The filter leaf of claim 2, in which the closure member comprises a pan having a flat bottom surface surrounded by an upwardly extending peripheral wall, the peripheral wall having an edge surface defining the band and the screen is planar.

8. The filter leaf of claim 2, in which the screen and the closure member are made of stainless steel.

9. The filter leaf of claim 2, having a fluid outlet formed in the closure member.

10. The filter leaf of claim 2, in which the bead has a flange extending into the closure member from the edge of the screen toward the center of the closure member.

11. The filter leaf of claim 3, in which the screen comprises a three-layer diffusion-bonded laminate having an outer layer of fine mesh screen, an intermediate layer of coarse mesh screen, an an inner layer of perforated plate more rigid than the screens.

12. The filter leaf of claim 11, in which the intermediate screen and the perforated plate fit entirely inside the frame.

13. The filter leaf of claim 2, in which the bead has a continuous flange extending into the closure member toward the center of the screen.

14. The filter leaf of claim 12, in which the flange extends into the closure member at an angle between about 30 degrees and about 50 degrees with respect to the planar surface.

15. The filter leaf of claim 13, in which the angle is about 40 degrees.

* * * * *

UNITED STATES PATENT AND TRADEMARK OFFICE
CERTIFICATE OF CORRECTION

PATENT NO. : 4,446,352

DATED : May 1, 1984

INVENTOR(S) : Theodore H. O'Cheskey; Hugh T. Edwards, Jr.

It is certified that error appears in the above-identified patent and that said Letters Patent is hereby corrected as shown below:

On the title page

In item [63] of the patent, Application Serial No. 177,265 filed August 11, 1980, has not been abandoned as stated.

Column 1, line 8, "now abandoned" should be deleted.

Signed and Sealed this

Twenty-sixth Day of March 1985

[SEAL]

Attest:

DONALD J. QUIGG

Attesting Officer     Acting Commissioner of Patents and Trademarks